United States Patent
Ryu

(10) Patent No.: US 9,405,554 B2
(45) Date of Patent: Aug. 2, 2016

(54) METHOD FOR INITIALIZING EXPENDED MODULES IN PROGRAMMABLE LOGIC CONTROLLER SYSTEM

(71) Applicant: LSIS CO., LTD., Anyang-si, Gyeonggi-do (KR)

(72) Inventor: Hwa Soo Ryu, Nonsan-si (KR)

(73) Assignee: LSIS CO., LTD., Anyang-Si (KR)

( * ) Notice: Subject to any disclaimer, the term of this patent is extended or adjusted under 35 U.S.C. 154(b) by 121 days.

(21) Appl. No.: 14/171,582

(22) Filed: Feb. 3, 2014

(65) Prior Publication Data

US 2014/0281446 A1 Sep. 18, 2014

(30) Foreign Application Priority Data

Mar. 18, 2013 (KR) ........................ 10-2013-0028444

(51) Int. Cl.
*G06F 9/44* (2006.01)

(52) U.S. Cl.
CPC ............ *G06F 9/4401* (2013.01); *G06F 9/4411* (2013.01)

(58) Field of Classification Search
CPC ............... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | | |
|---|---|---|---|---|
| 5,552,981 A | * | 9/1996 | Yamada | ................ G06F 15/177 700/2 |
| 2002/0174381 A1 | * | 11/2002 | Olarig | ................ G06F 11/2284 714/25 |
| 2005/0071580 A1 | * | 3/2005 | LeClerg | ................ G11C 29/26 711/154 |
| 2010/0052428 A1 | * | 3/2010 | Imamura | ........... H01M 10/4207 307/77 |
| 2011/0145556 A1 | * | 6/2011 | Hakoun | .................. G06F 1/266 713/1 |
| 2011/0316858 A1 | * | 12/2011 | Shen | ................... G06F 3/04817 345/473 |
| 2013/0226993 A1 | * | 8/2013 | Dorey | ..................... H04L 67/10 709/203 |

FOREIGN PATENT DOCUMENTS

| | | |
|---|---|---|
| CN | 101145046 | 3/2008 |
| CN | 102033502 | 4/2011 |

(Continued)

OTHER PUBLICATIONS

The State Intellectual Property Office of the People's Republic of China Application Serial No. 201410099413.X, Office Action dated Mar. 2, 2016, 6 pages.

*Primary Examiner* — Chun Cao
*Assistant Examiner* — Mohammad A Rahman
(74) *Attorney, Agent, or Firm* — Lee, Hong, Degerman, Kang & Waimey; Jonathan Kang; Richard Salfelder

(57) ABSTRACT

A method for initializing expended modules in PLC (Programmable Logic Controller) system is provided in which an initialization request signal is generated and transmitted to a plurality of expended modules, when one basic unit initializes a plurality of expended modules, and an initialization completion signal is sequentially transmitted by the plurality of expended modules, when the initialization is completed, whereby the initialization time can be optimized, the method including performing an initialization operation after generating, by a basic unit, an initialization request signal and transmitting the initialization request signal to a plurality of expended modules, and determining that the initialization operation is completed, when an initialization completion signal is received from the expended modules connected to the basic unit.

2 Claims, 4 Drawing Sheets

(56) References Cited

FOREIGN PATENT DOCUMENTS

| CN | 102656538 | 9/2012 |
| KR | 10-0927092 | 11/2009 |
| KR | 10-0932148 | 12/2009 |

* cited by examiner

METHOD FOR INITIALIZING EXPENDED MODULES IN PROGRAMMABLE LOGIC CONTROLLER SYSTEM

CROSS-REFERENCE TO RELATED APPLICATION

Pursuant to 35 U.S.C. §119(a), this application claims the benefit of earlier filing date and right of priority to Korean Application Number 10-2013-0028444, filed on Mar. 18, 2013, the contents of which are incorporated by reference herein in its entirety.

BACKGROUND OF THE INVENTION

1. Field of the Invention

Exemplary aspects of the present disclosure relate to a method for initializing expended modules in PLC (Programmable Logic Controller) system mounted with one basic unit and a plurality of expended modules, whereby an initialization time of an entire PLC system can be optimized by accurately recognizing, by the one basic unit, completion of initialization of the plurality of expended modules, when the one basic unit initializes the plurality of expended modules.

2. Description of Related Art

Apparatuses for factory automation of various types have emerged concomitant with technical development in automation fields owing to sophisticated technologies.

A PLC (Programmable Logic Controller) system among the apparatuses for factory automation uses programmable memories for implementing various functions such as logic, sequence, timing, counting and computing through digital or analog input/output modules. The PLC system, a core element for factory automation, is one of the apparatuses configured to control various types of equipment, machines and processors in a factory, and very effective means configured to satisfy various requirements for factory automation.

FIG. 1 is a schematic block diagram illustrating a configuration of a PLC system applied to a method for initialization according to prior art.

Referring to FIG. 1, the PLC system generally includes one basic unit (100) including a computing device, and a plurality of expended modules (110-1, 110-2, . . . , 110-N) configured to perform a data communication operation with an external device in response to control of the computing device, where the one basic unit (100) and the plurality of expended modules (110-1, 110-2, . . . , 110-N) respectively include an interface module (not shown).

The interface modules respectively mounted on the one basic unit (100) and the plurality of expended modules (110-1, 110-2, . . . , 110-N) are connected in series, for example, where a predetermined data (IS) transmitted by the one basic unit (100) is sequentially transmitted to the plurality of expended modules (110-1, 110-2, . . . , 110-N), and the data (IS) transmitted by the plurality of expended modules (110-1, 110-2, . . . , 110-N) is sequentially transmitted to the one basic unit (100) via the plurality of expended modules (110-1, 110-2, . . . , 110-N) at a previous stage.

FIG. 2 is a signal flowchart illustrating an operation of a basic unit applied to a method for initialization according to prior art.

Referring to FIG. 2, the basic unit (100) generates an initialization signal for the plurality of expended modules (110-1, 110-2, . . . , 110-N), when there is a need to initialize the plurality of expended modules (110-1, 110-2, . . . , 110-N), and transmits the generated initialization signal (IS) to an expended module (110-1) (S200). The expended module (110-1) performs an initialization operation subsequent to transmission of an initialization request signal (IS) to a next expended module (110-2), when the initialization request signal (IS) is received.

Furthermore, the expended module (110-2) performs an initialization operation subsequent to transmission of an initialization request signal (IS) to a next expended module (110-3), and the next expended module (110-3) performs an initialization operation subsequent to transmission of an initialization request signal (IS) to a next expended module (110-4), and the initialization operations are completed until the initialization request signal (IS) is sequentially transmitted to an expended module (110-N) that is located at the last stage.

Under this circumstance, the basic unit (100) waits for a pre-set initialization required time (S202), where the pre-set initialization required time is set based on, for example, a required time of the initialization request signal (IS) to be transmitted to the expended module (110-N) that is located at the end, and an expended module that has the longest initialization required time among the plurality of expended modules (110-1, 110-2, . . . , 110-N).

The basic unit (100) determines that the initialization of the plurality of expended modules (110-1, 110-2, . . . , 110-N) has finished (S204), if the preset initialization required time lapses, and finishes the initialization operations.

Time required for performing the initialization operations may be changed depending on the circumstances of the plurality of expended modules (110-1, 110-2, . . . , 110-N). However, the abovementioned prior art suffers from disadvantages in that the basic unit (100) waits for the preset initialization required time to lapse, thereby generating unnecessary waiting time, even if initialization operations of the plurality of expended modules (110-1, 110-2, . . . , 110-N) are finished before the preset initialization required time lapses, whereby the initialization time cannot be optimized.

SUMMARY OF THE INVENTION

Exemplary aspects of the present disclosure are to substantially solve at least the above problems and/or disadvantages and to provide at least the advantages as mentioned below. Thus, the present disclosure is directed to provide a method for initializing expended modules in PLC (Programmable Logic Controller) system in which an initialization request signal is generated and transmitted to a plurality of expended modules, when one basic unit initializes a plurality of expended modules, and an initialization completion signal is sequentially transmitted by the plurality of expended modules, when the initialization is completed, whereby the initialization time can be optimized.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a method for initializing expended modules in PLC (Programmable Logic Controller) system, the method comprising:

performing an initialization operation after generating, by a basic unit, an initialization request signal and transmitting the initialization request signal to a plurality of expended modules; and determining that the initialization operation is completed, when an initialization completion signal is received from the expended modules connected to the basic unit.

Preferably, but not necessarily, the performing the initialization operation includes performing the initialization operation by allowing the plurality of expended modules to be sequentially connected to the basic unit, and by allowing the plurality of expended modules to sequentially receive the initialization request signal.

Preferably, but not necessarily, the determining that the initialization operation is completed includes transmitting the initialization completion signal to a previous stage, when initialization operation of the plurality of expended modules is completed and the plurality of expended modules receives the initialization completion signal from an expended module connected to a low level of the plurality of expended modules.

Preferably, but not necessarily, the plurality of expended modules performs the initialization operation by receiving the initialization request signal from the front end, and transmit the received initialization request signal to an expended module of next stage In an advantageous effect according to the method for initializing expended modules of the present disclosure, an initialization request signal is generated when a basic unit is to initialize a plurality of expended modules, and the initialization request signal is transmitted to the plurality of expended modules to receive an initialization completion signal without waiting for a preset initialization completion time, and to determine whether initialization of the plurality of expended modules is completed. Thus, the basic unit can promptly determine completion of initialization when the initialization of the plurality of expended modules is completed, whereby an initialization time can be optimized.

BRIEF DESCRIPTION OF THE DRAWINGS

Now, exemplary embodiments of the present disclosure will be described in detail with reference to the accompanying drawings, where the like reference numerals will be assigned to the like elements in the explanations of some figures.

DETAILED DESCRIPTION OF PREFERRED EMBODIMENTS

The present disclosure is herein described, by way of example only, with reference to the accompanying drawings. The present disclosure is presented in the cause of providing what is believed to be the most useful and readily understood description of the principles and conceptual aspects of the disclosure. In this regard, no attempt is made to show structural details of the invention in more detail than is necessary for a fundamental understanding of the disclosure and the description is taken with the drawings making apparent to those skilled in the art how the several forms of the invention may be embodied in practice.

Figure 1:
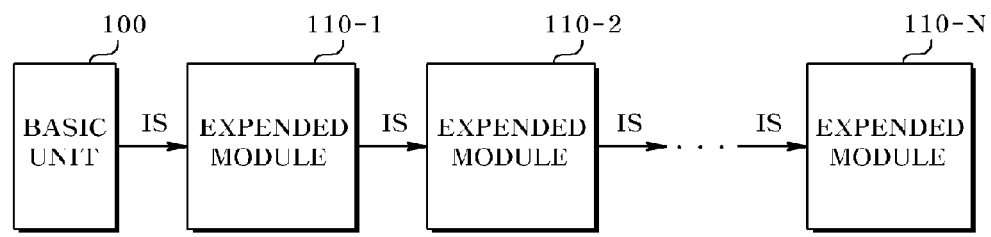
FIG. 1 is a schematic block diagram illustrating a configuration of a PLC system applied to a method for initialization according to prior art.
Figure 2:
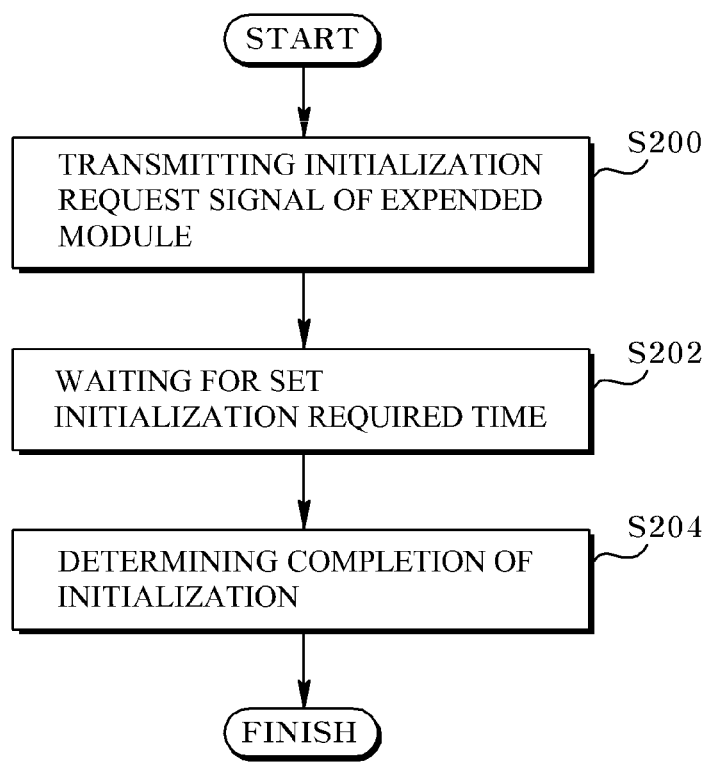
FIG. 2 is a signal flowchart illustrating an operation of a basic unit applied to a method for initialization according to prior art.
Figure 3:
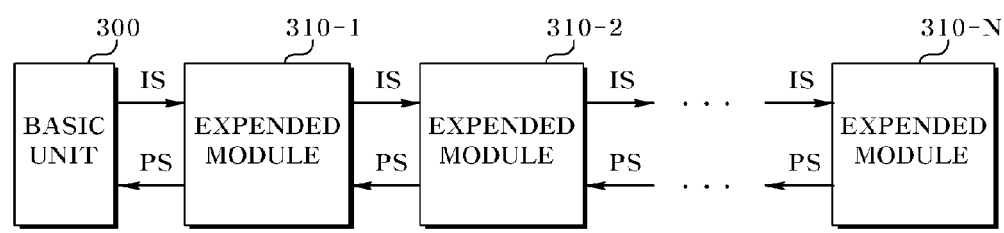
FIG. 3 is a block diagram illustrating configuration of a PLC system according to a method for initializing expended modules of the present disclosure.

FIG. 3 is a block diagram illustrating configuration of a PLC system according to a method for initializing expended modules of the present disclosure, where reference numeral 300 represents a single basic unit, and reference numerals 310-1, 310-2, . . . , 310-N represent plurality of expended modules.

Each of the single basic unit (300) and the plurality of expended modules (310-1, 310-2, . . . , 310-N) is mounted with an interface module (not shown) respectively.

At this time, the interface modules respectively mounted on the single basic unit (300) and the plurality of expended modules (310-1, 310-2, . . . , 310-N) are connected in series, and predetermined data (IS) transmitted by the single basic unit (300) is sequentially transmitted to each of the plurality of expended modules (310-1, 310-2, . . . , 310-N).

Furthermore, the predetermined data may be an initialization request signal (IS) configured to initialize the plurality of expended modules (310-1, 310-2, . . . , 310-N). Meanwhile, the data (IS) transmitted by the plurality of expended modules (310-1, 310-2, . . . , 310-N) are transmitted to the single basic unit (300) sequentially via the plurality of expended modules (310-1, 310-2, . . . , 310-N) at a previous stage.

In addition, the plurality of expended modules (310-1, 310-2, . . . , 310-N) performs an initialization operation by receiving an initialization request signal (IS), and generates an initialization completion signal (PS) and transmits, when the initialization operation is completed.

Figure 4:
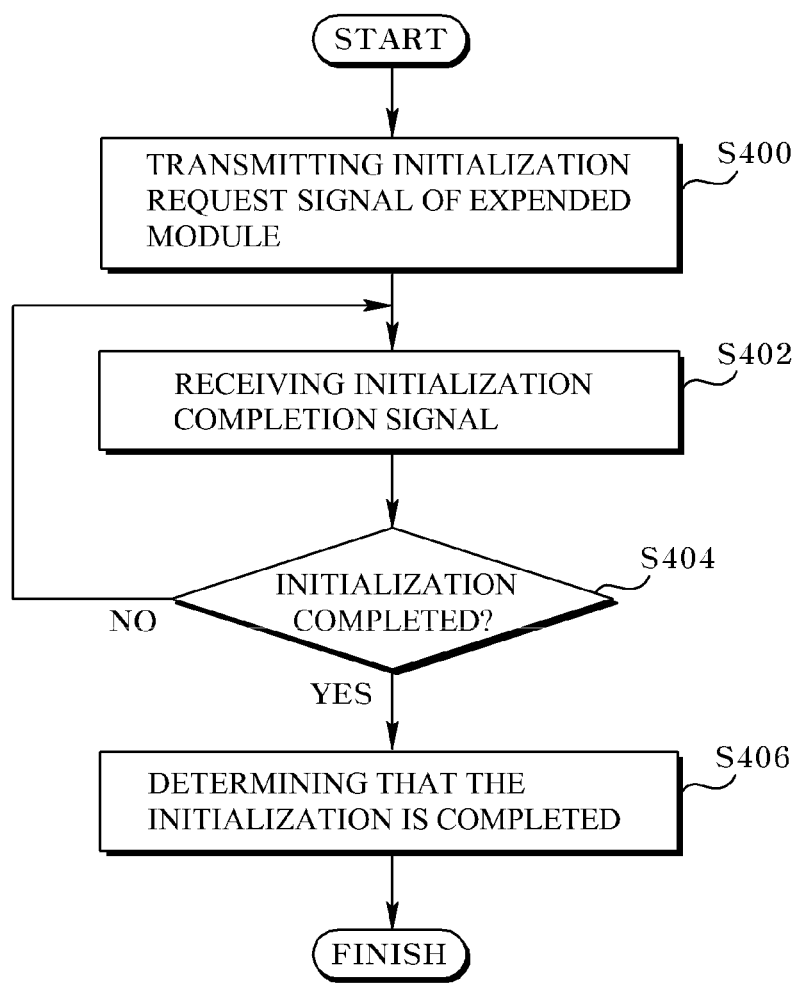
FIG. 4 is a signal flowchart illustrating an operation of a basic unit according to a method for initializing expended modules of the present disclosure.

FIG. 4 is a signal flowchart illustrating an operation of a basic unit according to a method for initializing expended modules of the present disclosure.

Referring to FIG. 4, the basic unit (300) generates an initialization request signal (IS) configured to initialize the plurality of expended modules (310-1, 310-2, . . . , 310-N), when there is a need to initialize the plurality of expended modules (310-1, 310-2, . . . , 310-N), and transmits the generated initialization request signal (IS) to the expended module (310-1) (S400).

The expended module (310-1) transmits the initialization request signal (IS) to a next expended module (310-2), when the initialization request signal (IS) is received, before performing an initialization operation.

Furthermore, the expended module (310-2) transmits the initialization request signal (IS) received from the expended module (310-1) of previous stage to a next expended module (310-3) and performs the initialization operation.

The expended module (310-3) transmits the initialization request signal (IS) received from the expended module (310-2) of the previous stage to a next expended module (310-4) and performs the initialization operation.

The initialization operations thus explained are repeated, where the initialization request signal (IS) is sequentially transmitted to a last expended module.

Under this state, the basic unit determines whether an initialization completion signal (PS) is received (S402).

The plurality of expended modules (310-1, 310-2, . . . , 310-N) generates an initialization completion signal (PS) of logic 1, when the initialization operation is completed, and transmits the generated initialization completion signal (PS) of logic 1 to an expended module at a previous stage.

That is, the expended module (310-N) generates an initialization completion signal (PS) of logic 1, when the initialization operation is completed, and transmits the signal to an expended module (310-(N-1)), where the expended module (310-(N-1)) generates an initialization completion signal (PS) of logic 1, when the initialization completion signal (PS) of logic 1 is received from the expended module (310-N) and its own initialization is completed and transmit the initialization completion signal (PS) to a previous stage.

This operation is repeatedly implemented, and the expended module (310-2) generates an initialization completion signal (PS) of logic 1, and transmits the signal to the expended module (310-1) when the initialization completion signal (PS) is received from the expended module (310-3) and its own initialization is completed.

Lastly, the expended module (310-1) generates an initialization completion signal (PS) of logic 1, and transmits the signal to the basic unit (300), when the initialization completion signal (PS) is received from the expended module (310-2) and its own initialization is completed.

The basic unit (300) receives the initialization completion signal (PS) inputted from the expended module (310-1) (S402), and determines whether the received initialization completion signal (PS) corresponds to logic 1, and determines whether initialization of the plurality of expended modules (310-1, 310-2, . . . , 310-N) has been completed (S404).

As a result of determination, if the received initialization completion signal (PS) inputted from the expended module (310-1) corresponds to logic 0, the basic unit (300) determines that the initialization for the plurality of expended modules (310-1, 310-2, . . . , 310-N) has not completed, and returns to S402 to repeat the operation of determining whether the initialization completion signal (PS) inputted from the expended module (310-1) corresponds to logic 1.

Under this state, the basic unit (300) determines that the initialization for the plurality of expended modules (310-1, 310-2, . . . , 310-N) has been all completed (S406), and finishes the operation, in a case the received initialization completion signal (PS) inputted from the expended module (310-1) corresponds to logic 1.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A method for initializing expended modules in a PLC (Programmable Logic Controller) system, the method comprising:
    performing an initialization operation after generating, by a basic unit, an initialization request signal and transmitting the initialization request signal to a plurality of expended modules sequentially connected to the basic unit; and
    determining, by the basic unit, that the initialization operation is complete when an initialization completion signal is received,
    wherein performing the initialization operation includes a first of the plurality of expended modules receiving the initialization request signal from the basic unit and transmitting the initialization request signal to a next subsequent one of the plurality of expended modules and each of the next subsequent plurality of expended modules transmitting the request signal to a next subsequent one of the plurality of expended modules until the initialization request signal is received by a last of the plurality of expended modules, and
    wherein determining that the initialization operation is complete includes the last of the plurality of expended modules generating an initialization completion signal upon completing its initialization and transmitting the generated initialization completion signal to a next previous one of the plurality of expended modules and each of the next previous plurality of expended modules generating and transmitting an initialization completion signal to a next previous one of the plurality of expended modules upon completing its initialization until the first of the plurality of expended modules receives an initialization completion signal from a second of the plurality of expended module and generates and transmits an initialization completion signal to the basic unit upon completing its initialization.

2. The method of claim 1, wherein each of the plurality of expended modules except the last of the plurality of expended modules performs its initialization upon receiving an initialization request signal.

* * * * *